Figure 1:
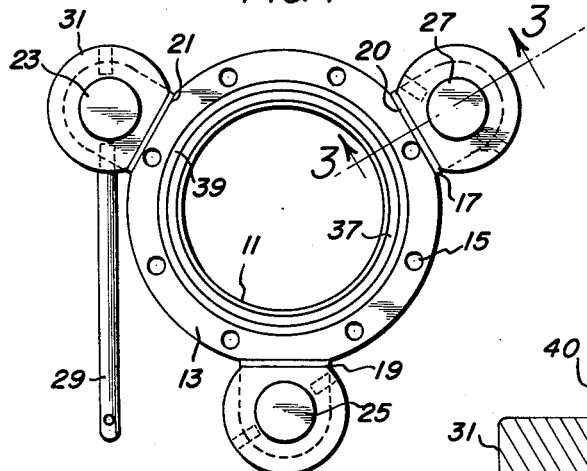

Aug. 15, 1961   W. H. GRAVERT   2,996,318
CAM OPERATED QUICK ACTING PIPE COUPLER
Filed June 17, 1958   2 Sheets-Sheet 1

INVENTOR
WILLIAM H. GRAVERT
BY Max L. Libman
ATTORNEY

Aug. 15, 1961 W. H. GRAVERT 2,996,318
CAM OPERATED QUICK ACTING PIPE COUPLER
Filed June 17, 1958 2 Sheets-Sheet 2
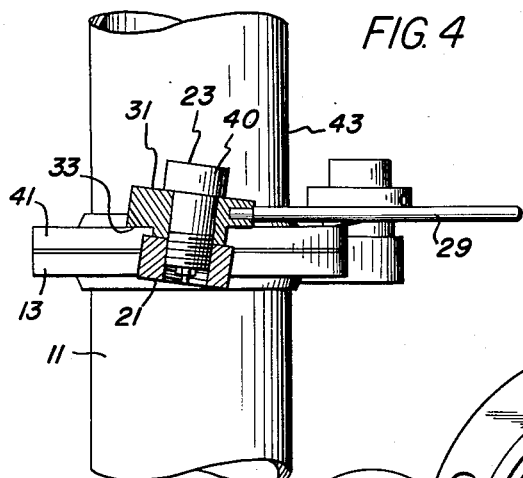
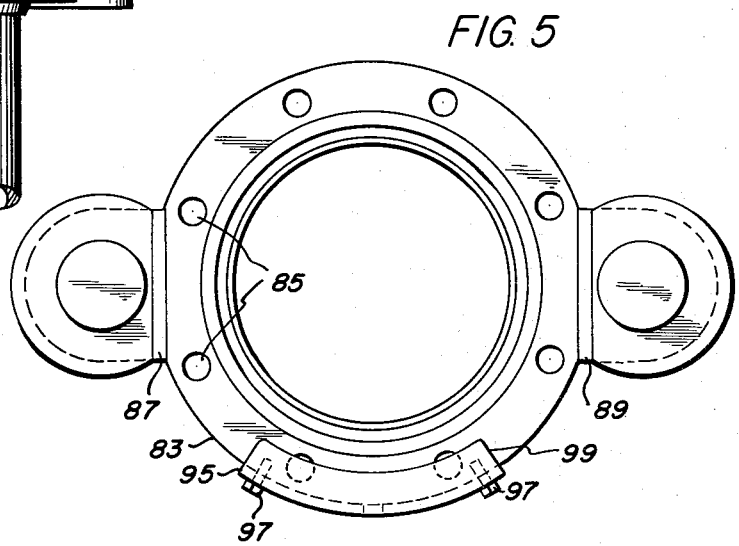
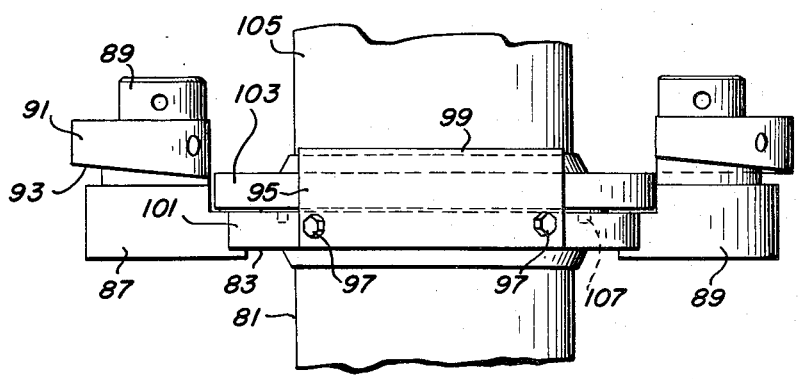
INVENTOR
WILLIAM H. GRAVERT
BY Max L. Libman
ATTORNEY

United States Patent Office 2,996,318
Patented Aug. 15, 1961

2,996,318
CAM OPERATED QUICK ACTING PIPE COUPLER
William H. Gravert, Port Washington, N.Y., assignor to Marine Moisture Control Company, Inc., Inwood, N.Y., a corporation of New York
Filed June 17, 1958, Ser. No. 742,516
2 Claims. (Cl. 285—358)

This invention relates to pipe couplings, and more particularly, to a new and improved means for rapidly and efficiently coupling together hoses, pipes and tubes.

Pipe couplings are not new, but have been known for thousands of years, and over the ages they have been improved many times and in many ways. Modern use of irrigation and the expanded use of liquid fuels in recent years have both greatly increased the use of pipes and tubes and have, consequently, brought new problems in the methods and the apparatus used for coupling pipes and tubes together. In the transportation of oil, gasoline, and other liquid fuels, the problems are particularly acute. Most of the transportation of fuels is done by tanker ships, each of which must be loaded with the fuel at the beginning of its voyage and must be unloaded at the end. In each operation there is a necessity for coupling a pipe or flexible hose from the ship to a land station or to another ship.

The normal means for coupling these supply hoses is by the use of a flanged coupling, the flanges having bolt holes penetrating them. The flexible hose or pipe, usually of large diameter, is brought adjacent a fixed member and is maneuvered into position by means of cranes, man-power, or any other convenient device, and, when the holes in the flanges are aligned, bolts are quickly projected therethrough to fasten the two flanges together. A gasket is usually provided to make the joint tight. When it is considered that these couplings are for tubes which run from eight to sixteen inches in diameter and are usually of metal, the problem of juggling these heavy members to align eight or twelve ¾ inch holes can be appreciated. After the holes are aligned and the bolts are inserted, nuts are then applied to each bolt and tightened up. The coupling must be tight, especially since fuels are commonly pumped at pressures up to 125 p.s.i. Uncoupling the two pipes requires almost as much time as coupling them, for up to twelve nuts must be removed from twelve bolts, the bolts withdrawn and then the movable member eased away from the stationary one. This may take as much as 30 minutes for the uncoupling, and in case of fire in one installation or the other, 30 minutes may be disastrous.

It is, therefore, an object of this invention to provide a new and improved coupling for pipes, tubes and the like.

It is a further object of this invention to provide new and improved pipe couplings by the adaption of a standard pipe member.

It is a further object of this invention to provide a new and improved pipe coupling which allows for rapid and positive coupling and uncoupling.

A further object of this invention is to provide a new and improved pipe coupling which allows rapid coupling and uncoupling of stationary and movable members by an adaptation of only one such member, the other being of standard construction.

Figure 3:
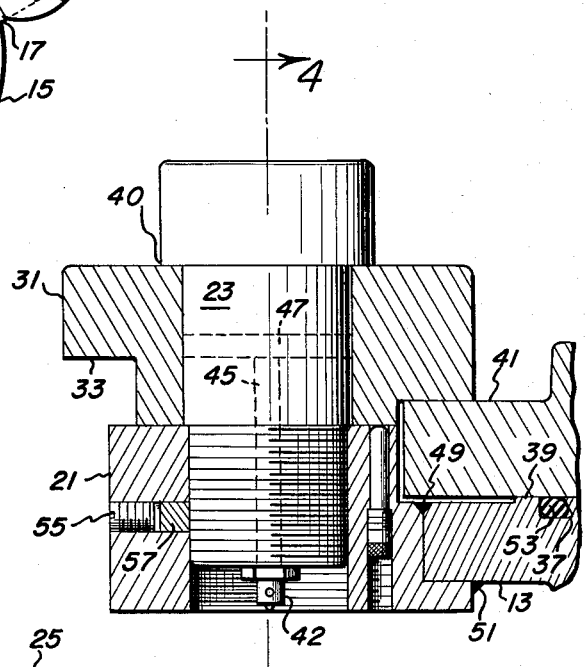
Figure 2:
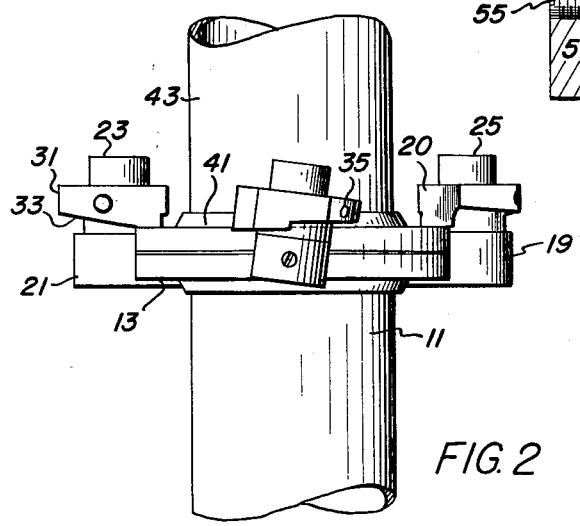

Further objects and advantages of this invention will become apparent as the following specification progresses, which specification should be taken with the accompanying drawings in which:

FIG. 1 is a plan view of the coupling of the invention;
FIG. 2 is an elevational view of the pipe coupling of the invention in use;
FIG. 3 is a sectional view of the coupling taken along line 3—3 of FIG. 1;
FIG. 4 is a sectional view taken along line 4—4 of FIG. 3 of a clamp in accordance with this invention;
FIG. 5 is a plan view of a modification of a coupling of FIG. 1; and
FIG. 6 is an elevational view of the coupling of FIG. 4 in use.

Referring now to FIGS. 1 and 2 in detail, the reference character 11 designates a standard "big-inch" tube or pipe having a standard steel flange 13 threaded on one end thereof. The flange 13, shown best in FIG. 1, has a plurality of bolt holes 15 perforating it at approximately equal spacings about its surface. Attached to the outer periphery of the flange 13 and spaced approximately 120° apart are three clamp supports 17, 19, and 21. These clamp supports may be attached to the flange 13 in any suitable manner, but welding is preferred. Alternatively, the flange and clamp supports may be cast as a unit, in which case the bolt holes 15 will be eliminated, as they are not used, and are shown only to indicate how the invention may be applied to a standard flange. The clamp supports, such as 21 shown in FIG. 4, are each provided with a threaded aperture for receiving bolts such as 23, or the bolts may be otherwise retained in any known manner. A cam member 31 is arranged to rotate on the bolt 23 by means of a capstan handle 29 which is fitted into an opening 35 on the cam 31. The bottom portion of the cam 31 has a sloped cam surface 33 which engages the top portion of a mating flange 41 attached to a tube or pipe 43 to which the tube 11 is to be coupled. As better shown in FIGS. 1 and 3, the flange 13 has a raised ring portion 39 and a groove 37 into which an O-ring of rubber or other suitable material is seated. This ring functions chiefly as a pressure gasket, and may be of any suitable cross-section, but available O-rings have been found very suitable. The O-ring, in its free position, should extend slightly above the raised portion 39.

The sectional view of FIG. 3 illustrates in better detail the structure of a portion of the two flanges 13 and 41 and a coupling member clamping them together. Since FIG. 3 is a sectional view of the structure shown in FIGS. 1 and 2, the reference characters used for the same structures are the same. The bolt 23 has a head 40 which bears against the top surface of the cam 31 to maintain that cam in close contact with the top surface of the flange 41. The bolt 23 is threaded at its lower end into the cam support 21. An "Alemite" or other suitable grease fitting 42 is attached to the lower end of the bolt 23 which has a central bore 45 therethrough communicating with a lateral bore 47. Grease injected through the grease fitting 43 is forced to the surface between the bolt 23 and the cam 31 to provide lubrication therefor. As shown in FIG. 3, the clamp support 21 is welded to the flange 13 by welds 49 and 51. The O-ring 53 can be seen in the groove 37 made in the raised portion 39 of the flange 13, and the mating flange 41 is shown clamped between the cam surface 33 and the raised portion 39 of the flange 13. The bolt 23 is maintained in the clamped support 21 by a lock member 55 which bears against a friction block 57 to maintain the threaded portion of the bolt 23 tight.

In operation, the tube 11 having the flange 13 thereon may be a stationary fixture at a land station or on board ship. The tube 43 carrying the flange 41 is a removable tube, flexible if desired, which is to couple with the pipe 11 for transferring fuel oil or other fluid from one installation to another. Removable pipe 43 is raised into position by any suitable means such as by a winch and crane or by manpower, and is guided so that the flange 41 is brought within the clamp members 19, 21, and 17 and the flanges 13 and 41 abut. The capstan rods 29 are then used to rotate the cams about their axes, causing the cam surfaces 33 to bear up against the flange 41 to lock that flange firmly against the raised surface 39 of the flange 13. As shown in FIGS. 1 and 2, the cam 31 rotates clockwise to lock against the flange 41, but the directions have no special significance. The raised portion 39 of the flange 13 abuts against the surface of the flange 41 providing a metal-to-metal contact for strength, and the O-ring 53 is compressed slightly by the flange 41 to provide a hydraulic seal.

To ensure a strong clamping structure, the cams are so arranged as to provide the maximum bearing surface between the cam and the flange. This is better shown in FIG. 4 wherein the clamp support 21 has the bolt 23 threaded therein at a slight angle with the longitudinal axis of the pipes 11 and 43. The angle which the bolt 23 forms with the longitudindal axis of the pipe 11 should be the same as the slope of the cam surface 33. In this manner, contact between the cam surface 33 and the top surface of the flange 41 is at a maximum, spreading the forces over the maximum surface and reducing unit pressures. As the cam 31 is rotated, its thicker portions gradually become wedged between the head 40 of the bolt 23 and the flange 41 to firmly clamp the flanges 13 and 41 together. Of course, canting the bolts 23, 25 and 27 is not necessary to this invention, but a superior coupling is secured thereby.

The structures shown in FIGS. 1 and 2 provide an extremely strong rapid acting coupling; however, the flange 41 must be guided in its descent so that it fits between the clamp supports 17, 19, and 21. For this reason, the cams are provided with flat surfaces such as shown at 20, which are oriented initially as shown in FIG. 1 to permit entry of the mating flange 41.

The structure illustrated in FIGS. 5 and 6 is a slightly modified form of that of FIGS. 1 and 2, but one which enables a more rapid coupling and decoupling of the device since only two cam locks are used. A pipe 81 carries a flange 83 which may be a standard flange having a plurality of bolt holes 85 therethrough. Clamp supports 87 and 89 are attached to the flange 83, by any suitable means such as welding, at diametrically opposite points. The structures of the clamps are essentially the same as those of FIGS. 1 and 2, the clamp 87 comprising a bolt 89 supporting a cam 91 having a sloping cam surface 93. The flange 83 has bolted thereon, or welded if desired, a curved L-shaped member 95 which forms a channel with the top surface of the flange 83. As shown in FIGS. 5 and 6, the member 95 is bolted to the flange 83 by bolts 97, providing a space between the top leg 99 of the member 95 and the top surface of the projection 101 of the flange 83 sufficient to accept a flange member 103 threaded on a pipe 105, which greatly facilitates correct positioning of mating flange 103. The flange 83 also comprises a notch 107 having an O-ring contained therein.

In operation the pipe 81, which bears the flange 83, may be a permanent installation on board a ship or a land station. When a movable pipe having a flange 103 attached thereto is to be coupled to the pipe 81 for the transmission of oil or other fluids therethrough, the flange 103 is brought closely adjacent the flange 83 by any suitable means such as a crane, a winch, or manpower, and the flange 103 is dropped into the channel formed between the L-shaped member 95 and the flange 83. The cams 91 are then rotated to firmly clamp the flange 103 against the flange 83, in the manner described in connection with FIGS. 1 and 2, to form a fluid-tight and structurally-strong seal. To decouple, it is necessary merely to rotate the cam members until the flange 103 is freed therefrom and lift out the pipe and the flange 103 from the channel between the L member 95 and the flange 83. Thus, coupling or decoupling the members can be accomplished in seconds. The cam surfaces 93 of FIGS. 5 and 6, are neither perpendicular nor parallel to the axis of the pin or bolt maintaining the cams in position. As discussed above, if bolts 89 were maintained perfectly vertical with respect to the flange 83, the cam surfaces 93 would then bear against the other flange 103 at only a small area. To provide as much contact surface as possible between the top surface of the flange 103 and the cam surfaces 93, the bolts are inserted in the clamped supports at an angle. This angle with the perpendicular to the flange should be the same as the slope of the cam surface. By this expedient, a large contacting surface between the locking cam surface and the flange is provided, increasing the friction therebetween and insuring that the cam does not work free in use.

This specification has described in detail a new and improved quick fastening and release coupling for standard flanged pipes of large diameter used for loading and unloading tankers, transferring fuel oils or other fluids from one location to another, or fueling ships and boats. The coupling device of this invention does not require that any ship or land station to which it is to be connected have modified pipes, but will properly function with the standard flanged pipe terminals common throughout the world today. Thus, no expensive universal modified structures are necessary but only that the installation desiring the quick connection and release coupling of this invention incorporate it into their structures. The structure of this invention has been tested at greater than 400 pounds per square inch fluid pressure, which is much greater than the pressures at which fluids are normally pumped. In addition to the quick coupling and decoupling features of the clamps of this invention, it is structurally strong and provides a leakproof connection. Since this description will suggest to those skilled in the art other structures incorporating the principles of this invention without invention thereover, it is intended that the scope of this invention be limited only by the attached claims.

I claim:

1. A quick acting coupling for heavy cargo pipes comprising a standard flat metal annular pipe flange of an approximately standard thickness within manufacturing tolerance limits fixed to the end of one pipe, a flat annular coupling flange fixed to the end of a second pipe to be coupled to said one pipe, the end faces of said flanges having smooth opposed annular flat bearing surfaces in mutual contact in the coupled position of said pipes, a plurality of pivot-bearing extensions fixed to the outer circumference of said coupling flange and substantially uniformly spaced about said circumference, each of said extensions supporting a pivot disposed at an angle slightly displaced from the pipe axis, a screw-type cam member rotatably supported on each said pivot and extending over a portion of said coupling flange, and having a cam surface opposed to a portion of the end face of said coupling flange, said cam surface being a section of a screw thread of less than one full turn, each said cam being so fashioned that the distance between said cam surface and said opposed portion of the coupling flange varies with rotation of the cam about its pivot from an amount greater than the maximum thickness of said standard flange to an amount smaller than the minimum thickness of any standard flange to which it may be coupled, the pivot of each cam being at an angle slightly displaced from the perpendicular to the end face of said coupling cam, and the active cam surface of each cam being substantially parallel to the face of said coupling flange whereby a maximum cam bearing surface is obtained.

2. The invention according to claim 1, there being two diametrically opposed such cams on said coupling flange, and a channel member fastened to an edge of said coupling flange intermediate said two cams and forming with the end face of said coupling flange a channel for freely receiving the edge of said standard flange to guide same into alignment with said coupling flange.

References Cited in the file of this patent

UNITED STATES PATENTS

| | | |
|---|---|---|
| 558,364 | Doolittle | Apr. 14, 1896 |
| 2,134,314 | O'Donnell | Oct. 25, 1938 |
| 2,407,076 | Harkness | Sept. 3, 1946 |
| 2,441,754 | Cobi | May 18, 1948 |
| 2,518,026 | Krapp | Aug. 8, 1950 |
| 2,761,703 | Olwin | Mar. 12, 1953 |

FOREIGN PATENTS

| | | |
|---|---|---|
| 548,314 | Germany | Dec. 31, 1930 |